US012586396B2

(12) United States Patent
Asahi et al.

(10) Patent No.: US 12,586,396 B2
(45) Date of Patent: Mar. 24, 2026

(54) INFORMATION PROCESSING APPARATUS AND SYSTEM

(71) Applicant: KABUSHIKI KAIBA TOSHIBA, Tokyo (JP)

(72) Inventors: Kazutaka Asahi, Kawasaki (JP); Hiroyuki Sakai, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 402 days.

(21) Appl. No.: 18/180,613

(22) Filed: Mar. 8, 2023

(65) Prior Publication Data

US 2023/0222824 A1 Jul. 13, 2023

Related U.S. Application Data

(63) Continuation of application No. PCT/JP2021/033762, filed on Sep. 14, 2021.

(30) Foreign Application Priority Data

Sep. 18, 2020 (JP) ................................ 2020-157632

(51) Int. Cl.
*G06V 30/12* (2022.01)
*G06F 3/023* (2006.01)
*G06V 30/424* (2022.01)

(52) U.S. Cl.
CPC .......... *G06V 30/127* (2022.01); *G06F 3/0237* (2013.01); *G06V 30/424* (2022.01)

(58) Field of Classification Search
CPC .... G06F 3/0237; G06F 3/0219; G06F 3/0233; G06V 30/424
See application file for complete search history.

(56) References Cited

U.S. PATENT DOCUMENTS

2011/0280435 A1 11/2011 Chiba
2019/0235726 A1 8/2019 Vasudev et al.
(Continued)

FOREIGN PATENT DOCUMENTS

JP S62-66366 U 4/1987
JP H8-206609 A 8/1996
(Continued)

OTHER PUBLICATIONS

European Patent Office, Extended European Search Report in EP App. 21869361.2, 9 pages (Oct. 1, 2024).
(Continued)

*Primary Examiner* — Vu Le
*Assistant Examiner* — Zaid Muhammad Saleh
(74) *Attorney, Agent, or Firm* — Finnegan, Henderson, Farabow, Garrett & Dunner, LLP

(57) ABSTRACT

According to an embodiment, an information processing apparatus includes an image interface, an input interface, a display interface, a manipulation interface, a storage unit, and a processor. The processor is configured to cause a display terminal through a display interface to display a screen so as to receive an input of a key through the manipulation interface; transmit an operation signal indicating the key to the one of external devices through the input interface; and when the key is a repeat key, transmit an operation signal for inputting a character string indicated by repeat information to the one of the external devices through the input interface.

12 Claims, 4 Drawing Sheets

(56) References Cited

U.S. PATENT DOCUMENTS

| | | | |
|---|---|---|---|
| 2022/0413623 | A1 | 12/2022 | Usami et al. |
| 2022/0415068 | A1 | 12/2022 | Usami et al. |

FOREIGN PATENT DOCUMENTS

| | | | | | |
|---|---|---|---|---|---|
| JP | H08206609 | A | * | 8/1996 | |
| JP | H9-57208 | A | | 3/1997 | |
| JP | H0957208 | A | * | 3/1997 | ........... G06V 10/987 |
| JP | 2010-211660 | A | | 9/2010 | |
| JP | 2016-224766 | A | | 12/2016 | |
| JP | 2021-140631 | A | | 9/2021 | |
| JP | 2021-140632 | A | | 9/2021 | |
| KR | 2002-0049697 | A | | 6/2002 | |
| KR | 2003-0068662 | A | | 8/2003 | |
| WO | WO-2019154744 | A1 | * | 8/2019 | ............. G16H 80/00 |

OTHER PUBLICATIONS

Japan Patent Office, International Search Report in PCT/JP2021/033762, 2 pages (Dec. 7, 2021).

Canadian Intellectual Property Office, Office Action in CA App. No. 3,190,637, 8 pages (Aug. 2, 2024).

* cited by examiner

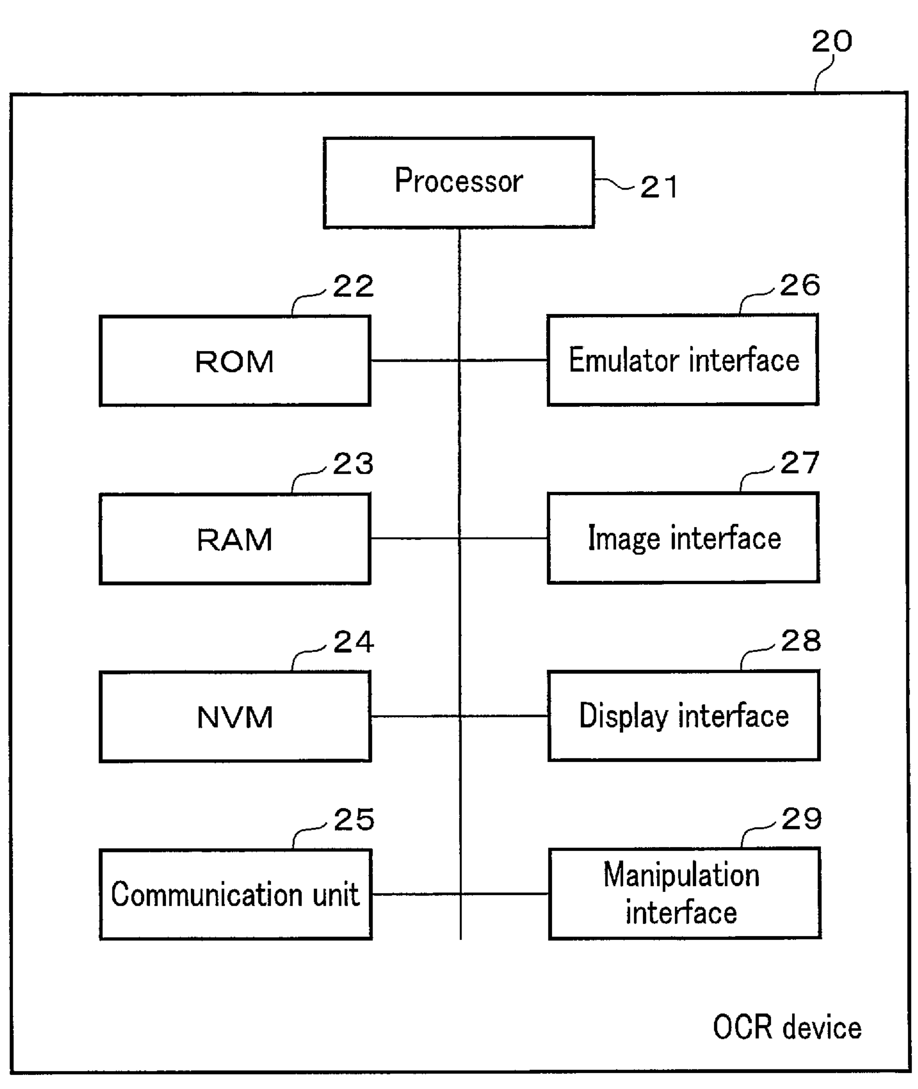
F I G. 3

INFORMATION PROCESSING APPARATUS AND SYSTEM

CROSS REFERENCE TO RELATED APPLICATIONS

This application is a Continuation Application of PCT Application No. PCT/JP2021/033762, filed Sep. 14, 2021 and based upon and claiming the benefit of priority from Japanese Patent Application No. 2020-157632, filed Sep. 18, 2020, the entire contents of all of which are incorporated herein by reference.

FIELD

Embodiments described herein relate generally to an information processing apparatus and system.

BACKGROUND

Information processing apparatuses for acquiring a screen of one of a plurality of video coding desks (VCDs) and performing optical character recognition (OCR) on the acquired image have been provided. If the OCR processing fails, the information processing apparatus displays a screen from the VCD and inputs an entry from an operator into the VCD.

Some VCDs are configured to receive an entry of a repeat key, which is for inputting the same entry as an entry input on the previous screen.

With a conventional technique, if a VCD on which an operator has previously made an entry differs from a VCD on which the operator is currently making an entry, a key entry that is input in response to a repeat key may not be the same as a key entry previously made by the operator.

BRIEF DESCRIPTION OF THE DRAWINGS

FIG. 3 is a block diagram illustrating an exemplary configuration of an OCR device according to the embodiment.

DETAILED DESCRIPTION

According to an embodiment, an information processing apparatus includes an image interface, an input interface, a display interface, a manipulation interface, a storage unit, and a processor. The image interface is configured to acquire a screen for inputting a character string from one of a plurality of external devices. The input interface is configured to input an operation signal to the one of the external devices. The display interface is configured to conduct communication with a display terminal. The manipulation interface is configured to conduct communication with a manipulation terminal. The storage unit is configured to store repeat information indicating a character string input to a preceding screen. The processor is configured to cause the display terminal through the display interface to display the screen so as to receive an input of a key through the manipulation interface; transmit an operation signal indicating the key to the one of the external devices through the input interface; and when the key is a repeat key, transmit an operation signal for inputting a character string indicated by the repeat information to the one of the external devices through the input interface.

Hereinafter, the embodiments will be described with reference to the drawings.

An input system according to an embodiment acquires from a VCD an image including a character string such as a postal code. The input system performs OCR processing (character recognition processing) upon the acquired image on the OCR device. The input system inputs into the VCD an operation signal for inputting a character string based on the result of the OCR processing. If the OCR processing fails, the input system displays the acquired image on the OCR device. The input system receives a key input from an operator via the OCR device. The input system supplies an operation signal of the key input from the OCR device into the VCD.

Figure 1:
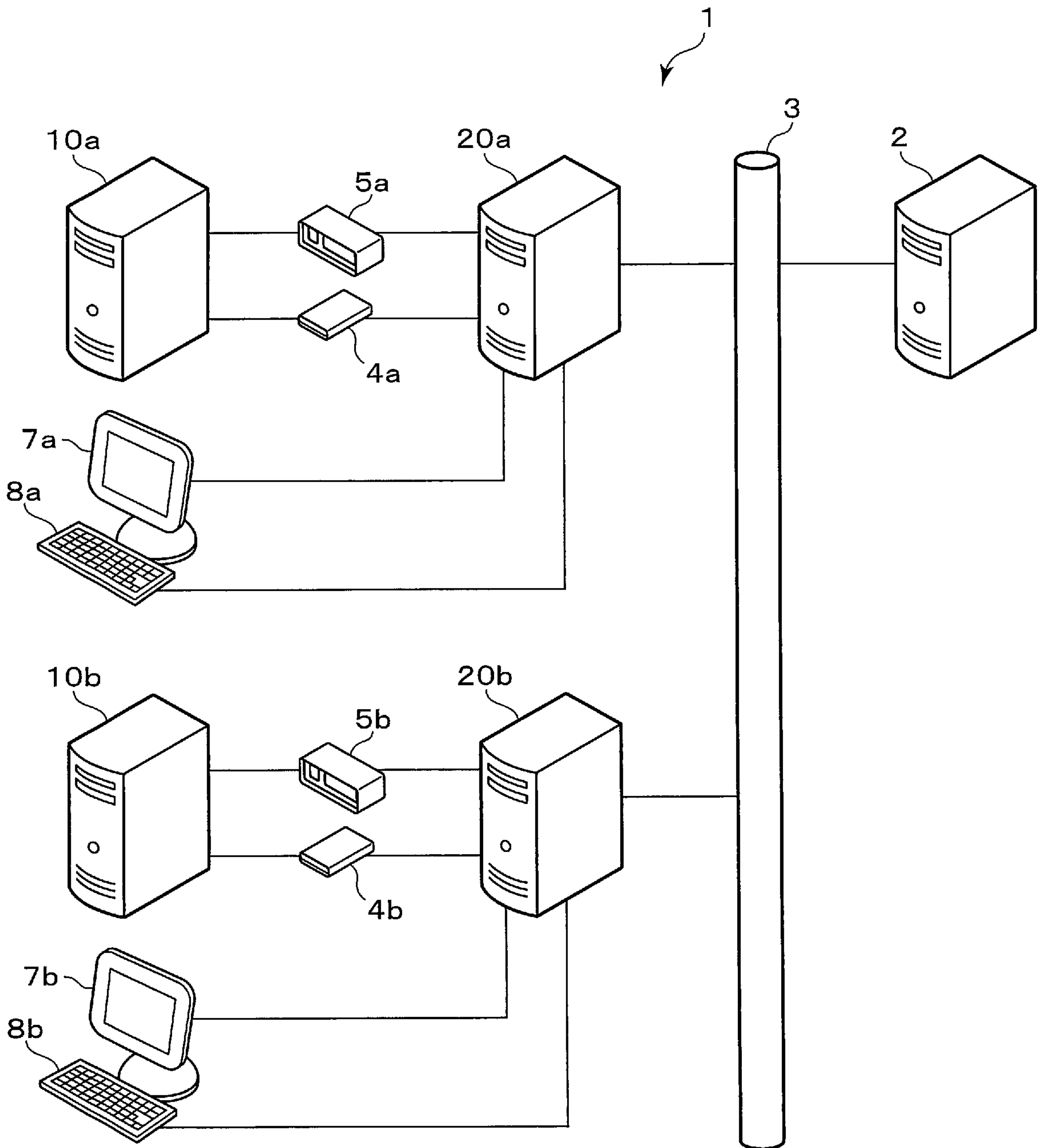
FIG. 1 is a block diagram illustrating an exemplary configuration of an input system according to an embodiment.

FIG. 1 illustrates an exemplary configuration of an input system 1 according to the present embodiment. As illustrated in FIG. 1, the input system 1 includes a management PC 2, a network 3, emulators 4, capture boards 5, display terminals 7, manipulation terminals 8, VCDs 10, and OCR devices 20.

The emulators 4 include a first emulator 4*a* and a second emulator 4*b*. The capture boards 5 include a first capture board 5*a* and a second capture board 5*b*. The display terminals 7 include a first display terminal 7*a* and a second display terminal 7*b*. The manipulation terminals 8 include a first manipulation terminal 8*a* and a second manipulation terminal 8*b*. The VCDs 10 include a first VCD 10*a* and a second VCD 10*b*. The OCR devices 20 include a first OCR device 20*a* and a second OCR device 20*b*.

The management PC 2 is connected to the network 3.

The first VCD 10*a* is connected to the first emulator 4*a* and the first capture board 5*a*. The first OCR device 20*a* is connected to the network 3, the first emulator 4*a*, the first capture board 5*a*, the first display terminal 7*a*, and the first manipulation terminal 8*a*.

The second VCD 10*b* is connected to the second emulator 4*b* and the second capture board 5*b*. The second OCR device 20*b* is connected to the network 3, the second emulator 4*b*, the second capture board 5*b*, the second display terminal 7*b*, and the second manipulation terminal 8*b*.

The input system 1 may further include components as necessary in addition to the configuration illustrated in FIG. 1, or specific components may be excluded from the input system 1.

The management PC 2 is configured to manage the entire input system 1. The management PC 2 transmits data to, and receives data from, the OCR device 20. The management PC 2 transmits various signals and the like to the OCR device 20 and the like. The management PC 2 also receives data (e.g. the result of the OCR processing) from the OCR device 20.

The network 3 relays communications between the management PC 2 and the OCR devices 20 and communications among the OCR devices 20. For instance, the network 3 may be a local area network (LAN).

A VCD 10 (first VCD 10*a* and second VCD 10*b*, or an external device) inputs a character string that is displayed in an image acquired from a certain processing apparatus, to this device.

For instance, the processing apparatus is a sorter that sorts articles such as mail or packages into shooters or the like. The processing apparatus captures with a camera an image of an address surface (bearing a recipient's address) of an article. When the image of the address surface is captured, the processing apparatus performs OCR processing (primary OCR) on the image (destination image or character string image) bearing the address surface in accordance with a predetermined algorithm (first algorithm).

When the OCR processing is performed, the processing apparatus acquires, as a character string, a destination written on the address surface of the article based on the result of the OCR processing. Upon acquisition of the destination, the processing apparatus sorts the article based on the acquired destination.

If the destination cannot be acquired due to a failure of the OCR processing, the processing apparatus transmits the destination image to the VCD 10.

The VCD 10 transmits the destination included in the destination image to the processing apparatus, as described later. The processing apparatus acquires a destination from the VCD 10. Upon acquisition of the destination, the processing apparatus sorts the article based on the acquired destination.

The VCD 10 acquires a destination image including an address surface. The VCD 10 transmits a screen (VCD screen) including the destination image to the OCR device 20. The VCD 10 acquires the destination described on the destination image from the OCR device 20. The VCD 10 transmits the acquired destination to the processing apparatus.

The VCD 10 will be described later in detail.

The emulators 4 (first emulator 4*a* and second emulator 4*b*) are configured to emulate manipulation terminals connected to the VCD 10, such as a keyboard and a mouse. The emulator 4 supplies to the VCD 10 an operation signal similar to the operation signal input by the operator through the manipulation terminals under the control of the OCR device 20. For instance, the emulator 4 supplies an operation signal indicating the movement or click of a mouse, a keyboard input, or the like to the VCD 10.

Here, the first emulator 4*a* supplies an operation signal to the first VCD 10*a* under the control of the first OCR device 20*a*. The second emulator 4*b* supplies an operation signal to the second VCD 10*b* under the control of the second OCR device 20*b*.

The capture board 5 is configured to acquire a VCD screen provided by the VCD 10, and to provide the acquired VCD screen to the OCR device 20.

Here, the first capture board 5*a* provides the VCD screen acquired from the first VCD 10*a* to the first OCR device 20*a*. The second capture board 5*b* provides the VCD screen acquired from the second VCD 10*b* to the second OCR device 20*b*.

The display terminal 7 is configured to display information under the control of the OCR device 20. That is, the display terminal 7 displays the information supplied from the OCR device 20. The display terminal 7 may be a liquid crystal monitor or the like. Alternatively, the display terminal 7 may be constituted by lamps such as light emitting diodes (LEDs).

Here, the first display terminal 7*a* displays information under the control of the first OCR device 20*a*, and the second display terminal 7*b* displays information under the control of the second OCR device 20*b*.

The manipulation terminal 8 is configured to receive various types of manipulations input by the operator. The manipulation terminal 8 transmits an operation signal indicating the input manipulation to the OCR device 20. The manipulation terminal 8 may be constituted by a keyboard, a mouse, or the like.

Here, the first manipulation terminal 8*a* transmits an operation signal indicating the input manipulation to the first OCR device 20*a*. The second manipulation terminal 8*b* transmits an operation signal indicating the input manipulation to the second OCR device 20*b*.

The OCR device 20 (information processing apparatus or external device) is configured to perform OCR processing (secondary OCR) on the destination image of the VCD screen acquired from the capture board 5. The OCR device 20 transmits the destination to the VCD 10 based on the result of the OCR processing. If the OCR processing fails, the OCR device 20 transmits to the VCD 10 a key input that is performed on the manipulation terminal 8. The OCR device 20 will be described later in detail.

Here, the first OCR device 20*a* transmits the destination or the key input to the first VCD 10*a*. The second OCR device 20*b* transmits the destination or the key input to the second VCD 10*b*.

Next, the VCD 10 will be described. Since the first VCD 10*a* and the second VCD 10*b* have the same configuration, they will be described as a VCD 10.

Figure 2:
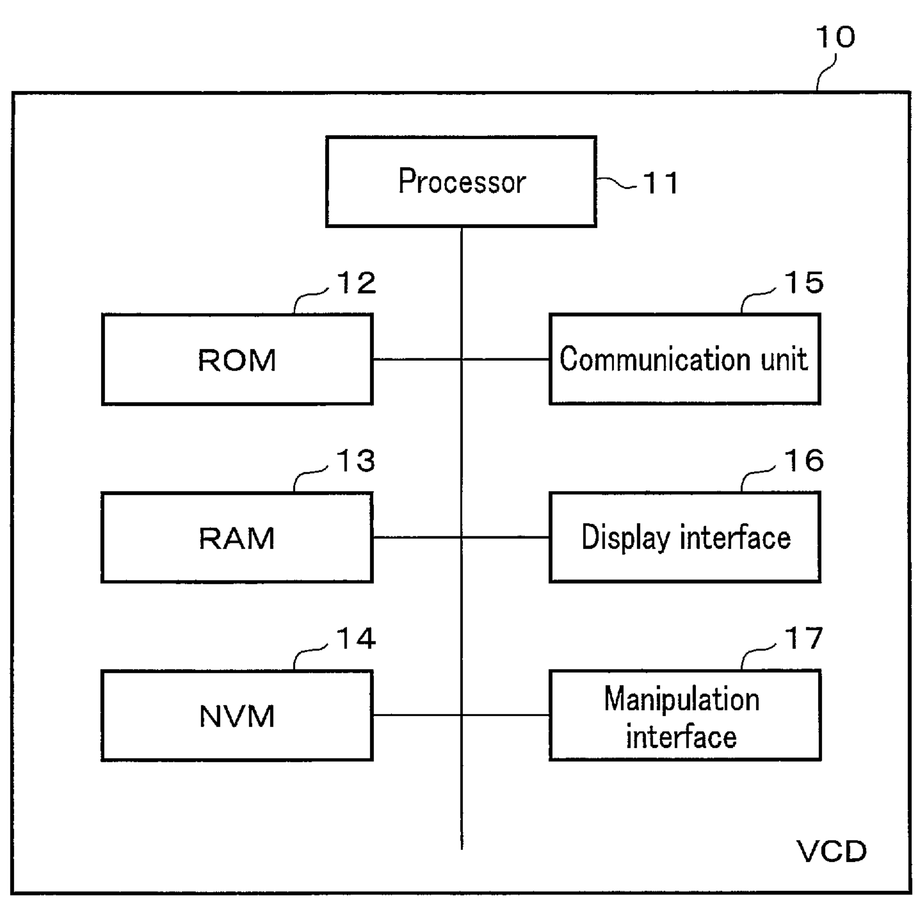
FIG. 2 is a block diagram illustrating an exemplary configuration of a VCD according to the embodiment.

FIG. 2 illustrates an exemplary configuration of the VCD 10 according to the present embodiment. FIG. 2 is a block diagram showing the exemplary configuration of the VCD 10. The VCD 10 includes a processor 11, a ROM 12, a RAM 13, an NVM 14, a communication unit 15, a display interface 16, a manipulation interface 17, and the like, as shown in FIG. 2.

The processor 11, ROM 12, RAM 13, NVM 14, communication unit 15, display interface 16, and manipulation interface 17 are connected to each other via a data bus or the like.

The VCD 10 may further include components as necessary in addition to the configuration illustrated in FIG. 2, or specific components may be excluded from the VCD 10.

The processor 11 has a function of controlling the overall operation of the VCD 10. The processor 11 may include an internal cache and various interfaces. The processor 11 realizes various types of processing by executing a program stored in advance in an internal memory, ROM 12, or NVM 14.

Part of the functions realized upon implementation of the program by the processor 11 may be realized by a hardware circuit. In this case, the processor 11 is configured to control the functions executed by the hardware circuit.

The ROM 12 is a non-volatile memory in which a control program and control data are stored in advance. The control program and control data stored in the ROM 12 are installed in advance according to the specifications of the VCD 10.

The RAM 13 is a volatile memory. The RAM 13 temporarily stores data that is currently subjected to the processing by the processor 11. The RAM 13 stores various application programs in response to an instruction from the processor 11. The RAM 13 may also store data necessary for implementing the application program and results of implementing the application program.

The NVM 14 is a data writable and rewritable nonvolatile memory. The NVM 14 may be constituted by an HDD, an SSD, a flash memory, or the like. The NVM 14 stores a control program, applications, various types of data, and the like in accordance with an operation use of the VCD 10.

The communication unit 15 is an interface for transmitting and receiving data to and from a predetermined processing apparatus. For instance, the communication unit 15 is an interface that supports wired or wireless LAN connection.

The display interface 16 is an interface for transmitting and receiving data to and from the capture board 5. The display interface 16 transmits the VCD screen to the capture board 5 under the control of the processor 11.

The manipulation interface 17 is an interface for receiving an input of a manipulation. For example, the manipulation interface 17 receives an operation signal indicating a manipulation input to a manipulation terminal such as a keyboard or a mouse. The manipulation interface 17 supplies the received operation signal to the processor 21. The manipulation interface 17 supports, for example, the universal serial bus (USB) connection.

Here, the manipulation interface 17 is connected to the emulator 4. That is, the manipulation interface 17 receives an operation signal from the emulator 4.

The VCD 10 may be a desktop personal computer or a notebook personal computer.

The processor 11 of the VCD 10 acquires a destination image from a predetermined processing apparatus through the communication unit 15. Upon acquisition of the destination image, the processor 11 generates a VCD screen for receiving an input of the destination shown in the destination image. The VCD screen includes the acquired destination image.

Upon generation of the VCD screen, the processor 11 outputs the generated VCD screen to the capture board 5 via the display interface 16.

If the VCD screen is output, the processor 11 receives an input of a destination through the manipulation interface 17. The processor 11 acquires, from the emulator 4 via the manipulation interface 17, a signal (operation signal indicating a key input or the like) similar to a signal input when a manipulation unit is connected.

Upon reception of an operation signal confirming the input through the manipulation interface 17 (e.g. an operation signal of the enter key being pressed), the processor 11 transmits the destination input through the communication unit 15 to the processing apparatus.

The processor 11 further receives an input of the repeat key via the manipulation interface 17. The repeat key is for inputting, on the current VCD screen, a key input (destination input) that has been performed on the immediately preceding VCD screen (e.g. a VCD screen for inputting the destination of a preceding mail article or the like).

For instance, the processor 11 receives keystrokes on predetermined keys on the keyboard as an input of the repeat key. As an input of the repeat key, the processor 11 may receive a tap on an icon displayed on the VCD screen.

Upon receipt of an input of the repeat key, the processor 11 acquires from the NVM 14 or the like the destination input to the immediately preceding VCD screen. Upon acquisition of the destination, the processor 11 transmits this destination to a predetermined processing apparatus via the communication unit 15.

The processor 11 further receives an input of a shortcut key via the manipulation interface 17. The shortcut key is for inputting a destination (e.g. a postal code, a district, or a street) that has been set up in advance. A plurality of shortcut keys may be set.

For instance, the processor 11 receives keystrokes on predetermined keys on the keyboard as an input of the shortcut key. As an input of the shortcut key, the processor 11 may receive a tap on an icon displayed on the VCD screen.

Upon receipt of an input of the shortcut key, the processor 11 acquires the destination bound to the input shortcut key from the NVM 14 or the like. Upon acquisition of the destination, the processor 11 transmits this destination to a predetermined processing apparatus via the communication unit 15.

Here, the first VCD 10*a* includes a processor 11*a*, a ROM 12*a*, a RAM 13*a*, an NVM 14*a*, a communication unit 15*a*, a display interface 16*a*, a manipulation interface 17*a*, and the like.

The second VCD 10*b* includes a processor 11*b*, a ROM 12*b*, a RAM 13*b*, an NVM 14*b*, a communication unit 15*b*, a display interface 16*b*, a manipulation interface 17*b*, and the like.

Next, the OCR device 20 will be described. The first OCR device 20*a* and the second OCR device 20*b*, which have the same configuration, will be described as OCR devices 20.

FIG. 3 illustrates an exemplary configuration of an OCR device 20 according to the present embodiment. FIG. 3 is a block diagram showing the exemplary configuration of the OCR device 20. The OCR device 20 includes a processor 21, a ROM 22, a RAM 23, an NVM 24, a communication unit 25, an emulator interface 26, an image interface 27, a display interface 28, a manipulation interface 29, and the like, as illustrated in FIG. 3.

The processor 21, ROM 22, RAM 23, NVM 24, emulator interface 26, image interface 27, display interface 28, and manipulation interface 29 are connected to each other via a data bus or the like.

The OCR device 20 may include components as needed in addition to the configuration illustrated in FIG. 3, or specific components may be excluded from the OCR device 20.

The processor 21 has a function of controlling the overall operation of the OCR device 20. The processor 21 may include an internal cache and various interfaces. The processor 21 realizes various types of processing by executing a program stored in advance in an internal memory, ROM 22, or NVM 24.

Part of the functions of the processor 21 realized upon implementation of the program by the processor 21 may be realized by a hardware circuit. In this case, the processor 21 is configured to control the functions executed by the hardware circuit.

The ROM 22 is a non-volatile memory in which a control program and the like are stored in advance. The control program and control data stored in the ROM 22 are installed in advance according to the specifications of the OCR device 20.

The RAM 23 is a volatile memory, temporarily storing data that is currently subjected to the processing by the processor 21. The RAM 23 stores various application programs in response to an instruction from the processor 21. The RAM 23 may also store data necessary for implementing the application programs, results of implementing the application programs, and the like.

The NVM 24 (storage unit) is a data writable and rewritable nonvolatile memory. For instance, the NVM 24 may be constituted by an HDD, an SSD, or a flash memory. The NVM 24 stores control programs, applications, various types of data, and the like in accordance with an operation use of the OCR device 20.

The NVM 24 stores information indicating a shortcut key and information indicating an operation bound to the shortcut key in association with each other.

Here, the NVM 24 stores in advance a table that includes information indicating a shortcut key and a destination input with this shortcut key as an operation bound to the shortcut key, in association with each other. The table may include destinations respectively bound to different shortcut keys. The table may be stored in the NVM 24 at the time of manufacturing the OCR device 20. Alternatively, the table may be stored in accordance with a manipulation of the operator of the OCR device 20. The table may be updated as appropriate.

The communication unit 25 (image interface or input interface) is an interface for transmitting and receiving data to and from the management PC 2 or another OCR device 20. The communication unit 25 is connected to the network 3. For instance, the communication unit 25 is an interface that supports wired or wireless LAN connection.

The emulator interface 26 (input interface) is an interface for transmitting and receiving data to and from the emulator 4. With the emulator interface 26, the emulator 4 outputs an operation signal to the VCD 10 under the control of the processor 21. For instance, the emulator interface 26 supports a USB connection.

The image interface 27 is an interface for transmitting and receiving data to and from the capture board 5. The image interface 27 acquires a VCD screen from the capture board 5. The image interface 27 provides the acquired VCD screen to the processor 21.

The display interface 28 is an interface for transmitting and receiving data to and from the display terminal 7. The display interface 28 displays information on the display terminal 7 under the control of the processor 21.

The manipulation interface 29 is an interface for transmitting and receiving data to and from the manipulation terminal 8. The manipulation interface 29 receives an operation signal indicating a manipulation input to the manipulation terminal 8. The manipulation interface 29 supplies the received operation signal to the processor 21. For instance, the manipulation interface 29 supports a USB connection.

The OCR device 20 may be a desktop PC or a notebook PC.

The emulator interface 26, image interface 27, display interface 28, and manipulation interface 29 (or part thereof) may be integrally formed.

Here, the first OCR device 20*a* includes a processor 21*a*, a ROM 22*a*, a RAM 23*a*, an NVM 24*a*, a communication unit 25*a*, an emulator interface 26*a*, an image interface 27*a*, a display interface 28*a*, a manipulation interface 29*a*, and the like.

The second OCR device 20*b* includes a processor 21*b*, a ROM 22*b*, a RAM 23*b*, an NVM 24*b*, a communication unit 25*b*, an emulator interface 26*b*, an image interface 27*b*, a display interface 28*b*, and a manipulation interface 29*b*.

Next, the functions implemented by the OCR device 20 will be described. The functions implemented by the OCR device 20 are realized by the processor 21 executing a program stored in the ROM 22 or NVM 24.

First, the processor 21 has a function of acquiring a VCD screen provided by a VCD 10.

That is, the processor 21 acquires a VCD screen that the VCD 10 displays on a display terminal (such as a display device) connected to the display interface 16.

For instance, the processor 21 acquires a VCD screen from the VCD 10 connected to the processor 21 itself. The processor 21 acquires the VCD screen from the capture board 5 via the image interface 27. That is, the capture board 5 acquires the VCD screen under the control of the processor 21. The capture board 5 provides the acquired VCD screen to the processor 21 via the image interface 27.

For instance, the processor 21 acquires the VCD screen at predetermined intervals (e.g. intervals of one second). The processor 21 may acquire the VCD screen when a change occurs in the VCD screen. If this is the case, whether a change has occurred in the VCD screen may be determined by the processor 21 in accordance with an image processing algorithm or the like.

The processor 21 has a function of acquiring a destination from the VCD screen through OCR (secondary OCR) processing.

Upon acquisition of the VCD screen, the processor 21 extracts a destination image from the VCD screen in accordance with a pre-acquired format or the like.

Upon extraction of the destination image, the processor 21 executes OCR processing upon the destination image in accordance with a predetermined algorithm (second algorithm), which differs from the first algorithm. With the second algorithm, at least part of the character image which cannot be recognized with the first algorithm can be recognized.

Upon the OCR processing, the processor 21 acquires the destination written on the address surface of an article based on the result of the OCR processing.

The processor 21 may perform predetermined processing upon the VCD screen or the destination image before executing the OCR process. For instance, the processor 21 may scale up or down the VCD screen or the destination image. The processor 21 may also perform a denoising process upon the VCD screen or the destination image.

The processor 21 transmits the destination acquired through the OCR processing to the VCD 10, using the emulator 4.

Upon acquisition of the destination through the OCR processing, the processor 21 transmits the destination to the manipulation interface 17 of the VCD 10, using the emulator 4. That is, the processor 21 transmits an operation signal for entering each key input of the destination to the manipulation interface 17.

The processor 21 may input, to the manipulation interface 17, an operation signal indicating an operation of completing the input of the destination.

The processor 21 is further provided with a function of receiving an input to the VCD screen in the event of a failure in the OCR processing at the processor 21 itself or a different OCR device 20.

First, a failure in the OCR processing that has been performed upon the VCD screen acquired by the processor 21 itself will be described.

The processor 21 displays a VCD screen acquired from the VCD 10 on the display terminal 7.

The VCD screen receives an input of a destination (e.g. a postal code, district, or street). For instance, the VCD screen displays a display field for displaying a destination image, an input form for receiving an input of a destination, and the like.

Upon display of the VCD screen on the display terminal 7, the processor 21 receives an input to the input form or the like of the VCD screen through the manipulation terminal 8.

Here, the operator inputs the destination on the manipulation terminal 8 while visually checking the destination image on the VCD screen displayed on the display terminal 7. Upon completion of the input of the destination, the operator inputs an operation of completing the input on the manipulation terminal 8.

Upon the key input by the operator on the manipulation terminal 8, the processor 21 receives an operation signal indicating the key input on the manipulation terminal 8 via the manipulation interface 29. The processor 21 transmits to the manipulation interface 17 of the VCD 10 an operation signal for the key input, using the emulator 4.

The processor 11 of the VCD 10 receives the operation signal from the emulator 4 via the manipulation interface 17. Upon receipt of the operation signal, the processor 11 creates a VCD screen bearing on the input form a character string based on the operation signal. Upon creation of the VCD screen, the processor 11 provides this VCD screen to the capture board 5 via the display interface 16.

The capture board 5 provides the provided VCD screen to the OCR device 20.

The processor 21 of the OCR device 20 acquires the VCD screen from the capture board 5 via the image interface 27. Upon acquisition of the VCD screen, the processor 21 displays the VCD screen (displaying the character string input to the input form or the like) on the display terminal 7 via the display interface 28.

The processor 21 of the OCR device 20 repeats the above operation until the operator finishes inputting the destination.

Next, a failure in the OCR processing at a different OCR device 20 will be described. Here, it is assumed that the second OCR device 20*b* has failed in the OCR processing and that the second OCR device 20*b* has the operator of the first OCR device 20*a* perform a destination input.

The processor 21*b* of the second OCR device 20*b* transmits the VCD screen, which includes a destination image that failed in the OCR processing, to the first OCR device 20*a* via the communication unit 25*b*.

The processor 21*a* of the first OCR device 20*a* acquires this VCD screen from the second OCR device 20*b* via the communication unit 25*a*. The communication unit 25*a* serves as an interface for acquiring a VCD screen from the second OCR device 20*b*.

Upon acquisition of the VCD screen, the processor 21*a* displays the VCD screen on the first display terminal 7*a* via the display interface 28. Upon display of the VCD screen, the processor 21*a* receives a key input through the first manipulation terminal 8*a*. The processor 21*a* transmits a signal indicating the key input to the second OCR device 20*b* via the communication unit 25*a*. Here, the communication unit 25*a* serves as an interface for transmitting the operation signal to the second VCD 10*b*.

The processor 21*b* of the second OCR device 20*b* acquires the signal from the first OCR device 20*a*. Based on this signal, the processor 21*b* transmits to the manipulation interface 17*b* of the second VCD 10*b* the operation signal indicating the key input to the first OCR device 20*a*, using the second emulator 4*b*.

The processor 11*b* of the second VCD 10*b* receives the operation signal from the second emulator 4*b* via the manipulation interface 17*b*. Upon receipt of the operation signal, the processor 11*b* generates a VCD screen bearing a character string based on the operation signal in the input form. Upon generation of the VCD screen, the processor 11*b* provides the VCD screen to the second capture board 5*b* via the display interface 16*b*.

The second capture board 5*b* provides the provided VCD screen to the second OCR device 20*b*.

The processor 21*b* of the second OCR device 20*b* acquires the VCD screen from the second capture board 5*b* via the image interface 27*b*. Upon acquisition of the VCD screen, the processor 21*b* transmits this VCD screen to the first OCR device 20*a* via the communication unit 25*b*.

The processor 21*a* of the first OCR device 20*a* receives the VCD screen from the second OCR device 20*b* via the communication unit 25*a*. Upon receipt of the VCD screen, the processor 21*a* displays the VCD screen (displaying a character string entered into the input form) on the first display terminal 7*a* via the display interface 28*a*.

The processor 21*a* of the first OCR device 20*a* repeats the above operation until the operator finishes inputting the destination.

The processor 21 has a function of, upon receipt of an input of a repeat key, supplying to the VCD 10 an operation signal for inputting a destination that has been input to the preceding VCD screen (e.g. the VCD screen for inputting a destination of the preceding mail article or the like).

The processor 21 stores, in the NVM 24, information (repeat information) indicating the destination input to the preceding VCD screen. Upon receipt of an input of a destination from the manipulation terminal 8 via the manipulation interface 29, the processor 21 stores the repeat information indicating this destination in the NVM 24.

For instance, every time a key input is received, the processor 21 adds this key input to the repeat information. The processor 21 keeps adding the key inputs to the repeat information until the input of a destination is completed. Upon the completion of the input of the destination, the processor 21 confirms the repeat information.

Upon receipt of an input of the next destination (destination of the subsequent mail article or the like), the processor 21 resets the repeat information and adds the key input. That is, the processor 21 updates the repeat information based on the key input.

Upon receipt of an input of the repeat key via the manipulation interface 29, the processor 21 acquires repeat information from the NVM 24. Upon acquisition of the repeat information, the processor 21 supplies to the VCD 10 an operation signal for inputting a destination indicated by the repeat information.

First, supply of operation signals to a VCD 10 connected to the processor 21 itself will be described. Using the emulator 4, the processor 21 sequentially transmits, to the manipulation interface 17 of the VCD 10, operation signals for entering a key input indicated by the repeat information.

Next, supply of operation signals to a VCD 10 connected to a different OCR device 20 will be described. It is assumed here that the processor 21*a* of the first OCR device 20*a* supplies operation signals to the second VCD 10*b*.

The processor 21*a* sequentially transmits signals indicating a key input indicated by the repeat information to the second OCR device 20*b* via the communication unit 25*a*.

The processor 21*b* of the second OCR device 20*b* sequentially acquires the signals from the first OCR device 20*a*. Using the second emulator 4*b*, the processor 21*b* sequentially inputs the operation signals for inputting a key input indicated by the signals to the manipulation interface 17*b* of the second VCD 10*b* based on each signal.

The processor 21 has a function of, upon receipt of an input of a shortcut key, supplying an operation signal for inputting a destination bound to the input shortcut key into the VCD 10.

Upon receipt of an input of the shortcut key via the manipulation interface 29, the processor 21 acquires the destination bound to the input shortcut key from the table in the NVM 24. Upon acquisition of this destination, the processor 21 supplies an operation signal for inputting this destination into the VCD 10.

First, supply of operation signals to the VCD 10 connected to the processor 21 itself will be described. The processor 21 sequentially transmits operation signals for inputting a key input of the destination to the manipulation interface 17 of the VCD 10 by using the emulator 4.

Next, supply of operation signals to a VCD 10 connected to a different OCR device 20 will be described. It is assumed here that the processor 21*a* of the first OCR device 20*a* supplies operation signals to the second VCD 10*b*.

The processor 21*a* sequentially transmits signals indicating a key input of the destination to the second OCR device 20*b* via the communication unit 25*a*.

The processor 21*b* of the second OCR device 20*b* sequentially acquires the signals from the first OCR device 20*a*. The processor 21*b* sequentially inputs the operation signals for inputting a key input indicated by the signals to the manipulation interface 17*b* of the second VCD 10*b* based on each signal by using the second emulator 4*b*.

Next, an exemplary operation of the OCR device 20 will be described.

Figure 4:
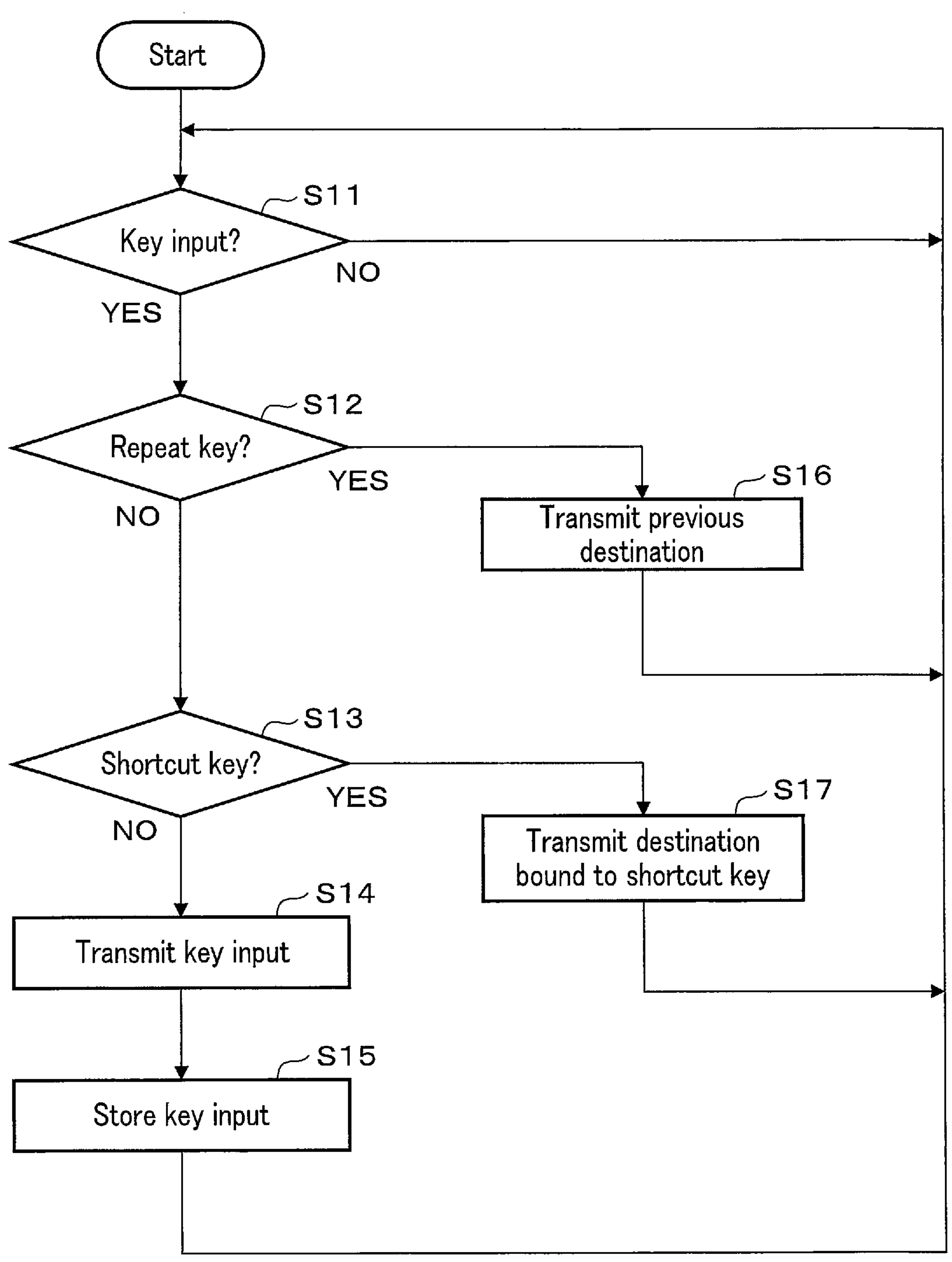
FIG. 4 is a flowchart illustrating an exemplary operation of the OCR device according to the embodiment.

FIG. 4 is a flowchart for explaining the exemplary operation of the OCR device 20.

It is assumed here that the processor 21 of the OCR device 20 has failed in the OCR processing on a destination image or that the processor 21 has acquired a VCD screen from another OCR device 20. It is also assumed that the processor 21 displays the VCD screen on the display terminal 7.

First, the processor 21 determines whether or not a key input has been received via the manipulation interface 29 (S11). If it is determined that no key input is received (no at S11), the processor 21 returns to S11.

If it is determined that a key input has been received (yes at S11), the processor 21 determines whether or not the input key is a repeat key (S12). If it is determined that the input key is not a repeat key (no at S12), the processor 21 determines whether or not the input key is a shortcut key (S13).

If it is determined that the input key is not a shortcut key (no at S13), the processor 21 transmits to VCD 10 an operation signal for entering the key input (S14). Upon transmission of the operation signal for entering the key input into the VCD 10, the processor 21 adds the key input to the repeat information (S15).

Upon addition of the key input to the repeat information, the processor 21 returns to S11.

If it is determined that the input key is a repeat key (yes at S12), the processor 21 transmits to the VCD 10 an operation signal for entering the key input indicated by the repeat information (S16). Upon transmission of the operation signal for entering the key input indicated by the repeat information into the VCD 10, the processor 21 returns to S11.

When it is determined that the input key is a shortcut key (no at S13), the processor 21 transmits to the VCD 10 an operation signal for entering a character string bound to the input shortcut key (S17). Upon transmission of the operation signal for entering a character string bound to the shortcut key into the VCD 10, the processor 21 returns to S11.

Upon completion of the input of the destination, the processor 21 may reset the repeat information.

The processor 21 may update the repeat information after the input of the next destination is completed.

In addition, an operation other than the input of a destination may be bound to the shortcut key. Upon reception of the input of the shortcut key, the processor 21 transmits an operation signal for executing an operation bound to the shortcut key to the VCD 10.

The OCR device 20 may be configured to transmit an operation signal to a plurality of VCDs 10.

As a character string, the processor 21 may enter an ID, address, name, e-mail address, telephone number, or the like to the VCD 10. The character string entered into the VCD 10 by the processor 21 is not limited to a specific content.

Further, the VCD 10 may be configured to not realize the function of the repeat key or the function of the shortcut key.

The processor 21 may be configured to realize the function of the emulator 4. For instance, the processor 21 realizes the function of the emulator 4 by executing a program stored in the NVM 24 or the like.

The OCR device 20 may be formed integrally with the emulator 4, the capture board 5, the display terminal 7, and the manipulation terminal 8.

In the event of a failure in the secondary OCR, the OCR device configured as described above displays a VCD screen and receives an input of a character string from the operator. Upon receipt of the input of the repeat key, the OCR device inputs into the VCD the destination input to the OCR device immediately before. As a result, the OCR device can suitably enter into the VCD the destination input immediately before by the operator.

Upon receipt of the input of the shortcut key, the OCR device inputs the destination bound to the shortcut key into the VCD. As a result, the OCR device can suitably input the destination intended by the operator into the VCD regardless of the destination bound to the shortcut key of the VCD.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
- an image interface configured to acquire a screen for inputting a character string from one of a plurality of external devices;
- an input interface configured to input an operation signal to the one of the external devices;
- a display interface configured to conduct communication with a display terminal;
- a manipulation interface configured to conduct communication with a manipulation terminal;
- a storage unit configured to store repeat information indicating an input character string input to a preceding screen; and
- a processor configured to:
  - cause the display terminal through the display interface to display the screen so as to receive an input of a key through the manipulation interface;
  - transmit a first operation signal indicating the key to the one of the external devices through the input interface; and
  - when the key is a repeat key, transmit a second operation signal for inputting the input character string indicated by the repeat information to the one of the external devices through the input interface.

2. The information processing apparatus according to claim 1, wherein
- the processor is configured to update the repeat information based on a key input that has been performed through the manipulation interface.

3. The information processing apparatus according to claim 1, wherein the storage unit stores a shortcut key and information indicating an operation bound to the shortcut key in association with each other, and when the key is a shortcut key, the processor transmits a third operation signal for executing the operation bound to the shortcut key to the one of the external devices through the input interface.

4. The information processing apparatus according to claim 3, wherein the operation bound to the shortcut key is an operation of inputting a predetermined character string.

5. The information processing apparatus according to claim 1, wherein the screen includes a character string image bearing the character string.

6. The information processing apparatus according to claim 5, wherein the character string image is an image for which a predetermined processing apparatus has failed in character recognition processing.

7. The information processing apparatus according to claim 6, wherein the predetermined processing apparatus is a sorter for sorting articles.

8. The information processing apparatus according to claim 5, wherein the processor is configured to:

execute character recognition processing on the character string image;

transmit a signal for inputting the character string to the one of the external devices through the input interface based on a result of the character recognition processing; and when the character recognition processing fails, receive an input of a key through the manipulation interface.

9. The information processing apparatus according to claim 1, wherein the input of the character string received on the screen is a destination.

10. The information processing apparatus according to claim 9, wherein the destination includes a postal code.

11. The information processing apparatus according to claim 1, wherein the input interface is connected to an emulator that emulates the manipulation terminal.

12. A system comprising an information processing apparatus, the system comprising:

an emulator configured to emulate a manipulation terminal connected to one of a plurality of external devices;

a display terminal configured to display a screen; and the manipulation terminal configured to input a manipulation, wherein the information processing apparatus comprises:

an image interface configured to acquire the screen for inputting a character string from the one of the external devices;

an input interface connected to the emulator; and a display interface configured to conduct communication with the display terminal;

a manipulation interface configured to conduct communication with the manipulation terminal;

a storage unit configured to store repeat information indicating an input character string that has been input to a preceding screen; and a processor configured to:

cause the display terminal through the display interface to display the screen so as to receive an input of a key through the manipulation interface;

transmit a first operation signal indicating the key to the one of the external devices through the input interface; and when the key is a repeat key, transmit a second operation signal for inputting the input character string indicated by the repeat information to the one of the external devices through the input interface.

* * * * *